United States Patent
Wilhelm in 't Hout et al.

(10) Patent No.: US 7,717,522 B2
(45) Date of Patent: May 18, 2010

(54) CONVEYOR SEGMENT, DRIVING MEANS AND METHOD FOR HIGH WALL MINING

(75) Inventors: Cornelis Wilhelm in 't Hout, Gouda (NL); Steven Allen Antoline, Mt. Lookout, WV (US); Paul Emile Van Es, Helvoirt (NL)

(73) Assignee: Superior Highwall Miners, Inc., Beckley, WV (US)

( * ) Notice: Subject to any disclaimer, the term of this patent is extended or adjusted under 35 U.S.C. 154(b) by 127 days.

(21) Appl. No.: 11/718,890

(22) PCT Filed: Nov. 11, 2004

(86) PCT No.: PCT/NL2004/000793
§ 371 (c)(1),
(2), (4) Date: Sep. 18, 2007

(87) PCT Pub. No.: WO2006/052123
PCT Pub. Date: May 18, 2006

(65) Prior Publication Data
US 2008/0100123 A1 May 1, 2008

(51) Int. Cl.
*E21F 13/02* (2006.01)
(52) U.S. Cl. .......................................... 299/18; 299/30
(58) Field of Classification Search ............. 299/18, 299/30, 64
See application file for complete search history.

(56) References Cited

U.S. PATENT DOCUMENTS

| 3,827,754 | A | 8/1974 | Gilley |
| 4,953,915 | A | 9/1990 | Jasser et al. |
| 6,027,175 | A | 2/2000 | Seear et al. |
| 6,220,670 | B1 * | 4/2001 | Mraz ............................ 299/18 |
| 2002/0130546 | A1 * | 9/2002 | Mraz ............................ 299/30 |

FOREIGN PATENT DOCUMENTS

GB    1 574 738 A    9/1977

OTHER PUBLICATIONS

PCT/NL2004/000793; International Search Report mailed Jul. 25, 2005.

* cited by examiner

*Primary Examiner*—John Kreck
(74) *Attorney, Agent, or Firm*—Renner, Otto, Boisselle & Sklar, LLP

(57) ABSTRACT

The invention relates to a conveyor segment for use in a train of conveyor segments for high wall mining, comprising: conveyor means for transporting mined material from and to opposite adjacent conveyor segments in a train of conveyor segments (1), and a transmission for transmitting power from and to opposite adjacent conveyor segments in a train of conveyor segments. The invention further relates to driving means (31). Moreover, the invention relates to an assembly of a conveyor segment and driving means, and to a train of conveyor segments. Further, the invention relates to a launching platform (30), and to a method for high wall mining.

12 Claims, 4 Drawing Sheets

CONVEYOR SEGMENT, DRIVING MEANS AND METHOD FOR HIGH WALL MINING

This application is a national phase of International Application No. PCT/NL2004/000793 filed Nov. 11, 2004 and published in the English language.

The invention relates to a conveyor segment for use in a train of conveyor segments for high wall mining, comprising: conveyor means for transporting mined material from and to opposite adjacent conveyor segments in a train of conveyor segments, and a transmission for transmitting power from and to opposite adjacent conveyor segments in a train of conveyor segments and for transmitting power to the conveyor means. The invention further relates to driving means. Moreover, the invention relates to an assembly of a conveyor segment and driving means, and to a train of conveyor segments. Further, the invention relates to a launching platform, and to a method for high wall mining comprising the process steps: the in succession coupling of a number of conveyor segments to form a train of conveyor segments connecting to a cutter head, the coupling of transmissions of adjacent conveyor segments, the driving of the coupled transmissions by an external power source locate outside the mine shaft, and the transportation of mined material from the cutter head by the train of conveyor segments towards the entrance of the mine shaft.

High wall mining is applied in the mining coal, minerals, ores or other materials in seams or veins under an overburden which may be accessed from an exposed edge of the seam or vein. Highwall mining is applicable where the appropriate machinery can be placed in a cut or trench to extend a cutterhead, followed by a train of conveyor segments or units as the cutter head advances, into a substantially horizontal shaft under the overburden. The conveyor segments are also known as push beams, as they are pushed into the mine, forming an elongating train of conveyor segments as the cutter head advances. Each conveyor segment normally has auger screw transporters or a conveyor belt to move coal from its lead end to its rear end and further onto the next rearward conveyor segment, and ultimately to the launch vehicle located outside the entrance of the mine shaft. The augers or conveyor belts can be powered by shafts connected from one conveyor segment to the next, thus transmitting and distributing the power of a motor on the launch vehicle along all conveyor segments of the train. As the train of conveyor segments is elongated, more power is needed for the transport of mined material. The strength of the power transmission of each conveyor segment is limiting the power that may be applied for transport. Damage or breakdown may occur when too much power is applied to a transmission. In order to prevent this, the speed of transport often has to be lowered when a train of conveyor segments grows longer.

The present invention aims to provide a train of conveyor segments that combines the advantages of the prior art conveyor segments with the possibility of a longer length than the existing trains of conveyor segments and/or that operates with an improved reliability.

The invention provides a conveyor segment as mentioned before, characterized in that the transmission is provided with coupling means for cooperation with driving means. These coupling means enable the coupling of driving means to a certain conveyor segment that is inserted into a train of conveyor segments, providing a local source of power for the transport means in addition to the main power supply located outside the mine shaft. As the train of conveyor segments becomes longer, the higher the required power is in order to maintain the speed of transport of mining material out of the mine shaft. An advantage of the present invention is that the power supply to a train of conveyor segments is not a restricting factor anymore in the maximum length of the train. The addition of conveyor segments enables the addition of more assisting driving means as the need for more transporting power rises. The driving means also enable a sustained transport speed as the train is elongated, without the risk of failure or damage to the transmission. Also, the invention enables the better distribution of mechanical power over the train of conveyor segments, resulting in a more energy-efficient process and in an improved reliability of the train. It is even possible to continue mining when a single driving means is out of order; at least when enough driving means are installed. Another advantage is that the transmissions will be less loaded as power can be provided from different locations over the length of a train of conveyor segments. Thus again the reliability of the transport of mined materials by a train of conveyor segments is improved. The use of conveyor segments comprising driving means allows for longer trains of conveyor segments, and thus deeper mining, without the need for increasing power on conveyor segment transmissions by the motor outside the mining shaft in order to maintain transport speed. The conveyor means and transmission means may be integrated, for instance in the shaft of an auger transporting screw, thus enabling a more compact design of the conveyor segment.

It is preferred if the coupling means are arranged for detachable coupling of driving means. Thus, rapid attachment or detachment of driving means is enabled, providing for a more flexible way of providing power for the transport of mining material. As driving means are only added if a need for more power arises, the energy used for the transport is used more efficiently. Moreover, it will be possible to make a longer train of conveyor segments when additional driving means are added to the train without compromising the speed of the transport.

It is advantageous if the conveyor segment comprises a driving means power supply for power supply to the driving means attached to the conveyor segment. Thus, the driving means may be powered by an external power source that is preferably located outside the mining shaft. Thus, it is easier to replace the power source if necessary, for instance in the case of failure or breakdown. The power supply may for instance be an electric or hydraulic power line, depending on the used type of driving means.

The invention also provides driving means for coupling to a conveyor segment according the invention. Such driving means may be coupled to any conveyor segment that may need additional driving power, thus making it possible act flexibly on an increasing need for transporting power without compromising the speed of the transport. Further, the energy consumption matches the need of the train of conveyor segments, resulting in a more energy-efficient transport of mining.

It is preferred if the driving means are provided with a grip for handling the driving means. Grips can include gripping elements, hooks or contra-hooks, or other elements that may be employed to lift or move the driving means. This improves the speed at which the driving means may be positioned on (or removed from) a conveyor segment according the invention. It also facilitates the performance of attachment or detachment of the driving means in an automated process, using for instance displacement means.

It is advantageous if the driving means comprise a controlling device. Thus, the driving means may be operated in a controlled matter, for instance by turning the driving means on and off as needed. This may be used to optimize the mining process, aiming for instance for a constant preferred speed, or optimized energy consumption. In a preferred embodiment, the controlling device comprises communication means. These may be employed for remote control of the driving means. Another possibility would be communication with controlling devices of other conveyor segments in the same train of conveyor segments, that would enable an optimized co-operation of a plurality of driving means, for instance to relieve torque from the transmissions of the conveyor segments.

In a preferred embodiment, the driving means comprise an electric motor. Electrical motors offer sufficient power and are easily monitored and adjusted during operation by electrical circuitry. Electrical motors may be powered by an electrical battery located in or near the driving means. However, it is preferred to use a power line, as this allows to located the power source outside the mine shaft were it may be easier to operate and replace in case of a breakdown.

In another preferred embodiment, the driving means comprise a hydraulic motor. A hydraulic motor is capable of providing sufficient power and a compact design of the driving means. Obviously, the hydraulic motor is best powered by an hydraulic power feed. Hydraulic systems provide a greater power and are essentially less hazardous than for instance electric systems.

The invention also provides an assembly of a conveyor segment according and driving means according the invention, wherein the driving means are connected to the transmission of the conveyor segment. Such an assembly may be inserted at any position in a train of conveyor segments in order to locally provide power for the transport means, thus allowing for a distribution of power that prevents mechanical overload of the transmission of conveyor segments, and thus allowing for a higher transport speed in longer trains of conveyor segments than would be possible without the use of the assembly according the invention.

The invention further provides a train of conveyor segments, comprising at least one assembly according the invention. Such a train offers the possibility of preventing and controlling the strain put on the transmission of the conveyor segment by an external main engine. Thus such a train allows for a higher transport speed of mined material from a cutter head located at one end of the train to the exit of the mining shaft located at the other end. Moreover, the transport may be done in a more energy-efficient manner compared to the same train without an assembly according the invention.

Preferably, the train of conveyor segments comprises a plurality of assemblies according the invention. Only part of the conveyor segments need to be powered conveyor segments according the invention, the others may be conveyor segments known in the state of the art, or conveyor segments according the invention without the additional driving means attached to them. It is preferred if the powered conveyor segments are evenly distributed along the train. Thus, power is distributed evenly along the train, enabling a relatively high transport speed and energy-efficient operation of the train.

The invention also provides a launching platform as mentioned before, characterized in that the launching platform also comprises second manipulating means for assembling driving means and conveyor segments in order to form an assembly according the invention.

It is preferred if the second manipulating means comprise an elevator. An elevator allows for precise positioning of usually rather heavy driving means. A lift also allows for automation of the coupling of the driving means.

The invention further provides a method for high wall mining as mentioned before, characterized in that the driving of the transmissions is assisted by at least one driving means attached to a conveyor segment according the invention incorporated in the train of conveyor segments.

It is preferred if the driving of the transmissions is assisted by a plurality of driving means connected to conveyor segments. Thus, better distribution of power provided by the driving means is possible, allowing for an even better strain control and energy efficiency.

In a preferred embodiment, the driving means are connected to conveyor segments mutually separated by at least one conveyor segment without driving means. As the power provided by the driving means is distributed by the transmissions of the conveyor segments, thus a single driving means may be used to control strain in the transmissions of several adjacent conveyor segments lacking driving means themselves.

The present invention will be further elucidated with reference to the non-limitative embodiments shown in the following figures, in which.

Figure 1A:
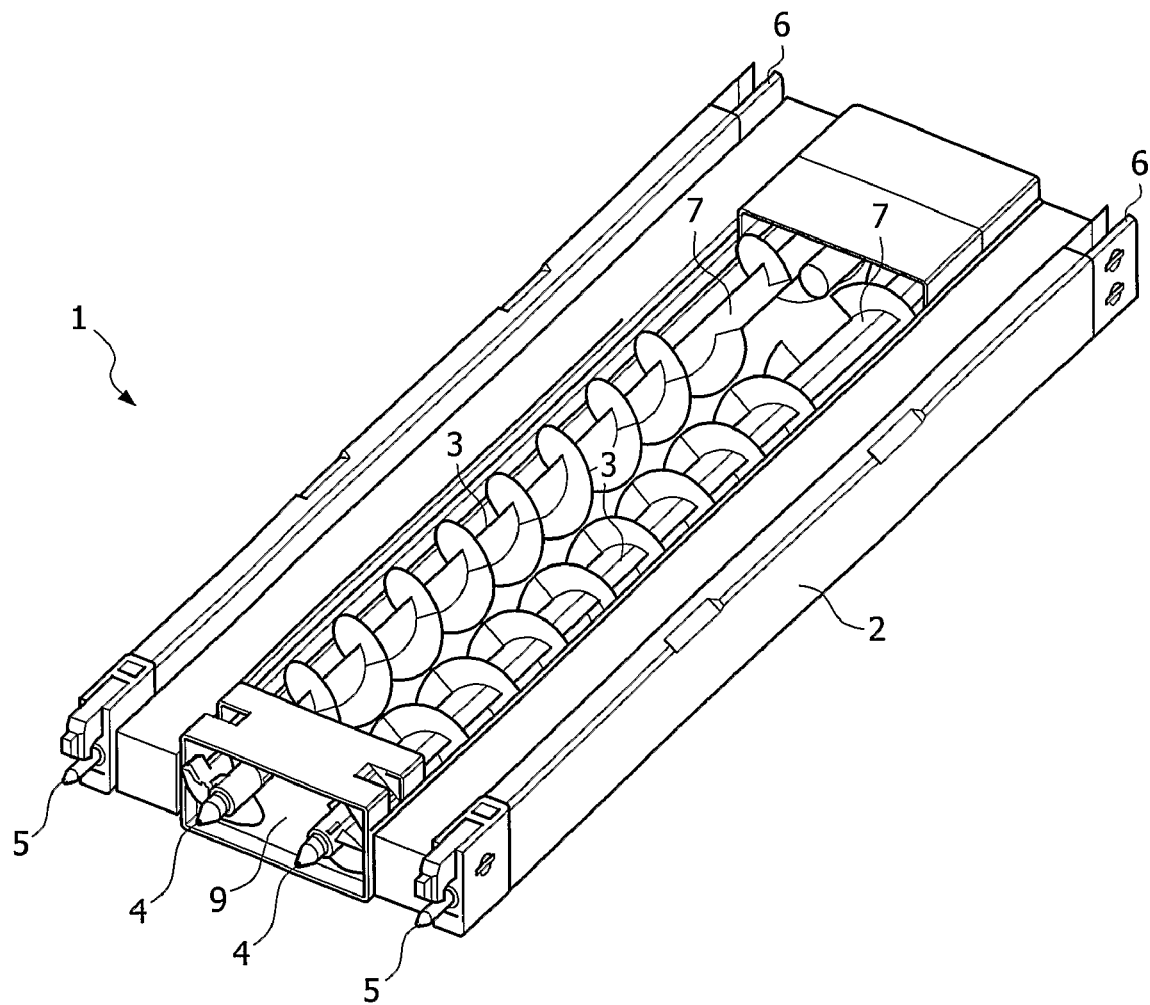
FIG. 1A shows a perspective view of a conveyor segment according the present invention.

FIG. 1A shows a conveyor segment 1 according the invention. The conveyor segment 1 comprises a housing 2 wherein two co-operating screw conveyors 3 are located for transporting mined material. The top of the housing 2 is omitted for clarity. During operation of the conveyor segment 1 the housing 2 is essentially closed except for openings at opposite sides of a transport channel 9 that holds the screw conveyors 3. The screw conveyors 3 comprise connectors 4 for attachment of the screw conveyors 3 to screw conveyors of adjacent conveyor segments 1 in a train of conveyor segments 1, not shown in this figure, driven by a main engine located at an end of the train outside the mine shaft. The connectors 4 also act as part of a transmission for mechanical power from and to adjacent screw conveyors 1. Each conveyor segment 1 also comprises locking means 5, and contra-locking means 6 fitting the locking means 5, to safeguard the coupling of adjacent conveyor segments in a train of conveyor segments. According the invention, the screw conveyors 3 that also act as a transmission of power to and from adjacent conveyor segments 1, also comprise coupling areas 7 for coupling additional local driving means (not shown here, see FIG. 1B). The coupling areas 7 are designed for interaction with for instance a driving wheel, driven by an electric or hydraulic additional motor. Such driving means may be attached to the conveyor segment 1 at any location in a train of conveyor segments 1 in order to relieve torque strain in the chain of interconnected screw conveyors 3 that also act as transmissions for the mechanical power from the main engine. The torque relief enabled by placement of one or more assisting motors in a train of conveyor segments 1 allows for a higher transport speed by the conveyor screws 6 as the danger of damage to the equipment due to torque strain is largely diminished. It is particularly effective to use one or more assisting motors on conveyor segments 1 that are at a location remote from the main engine in a train of conveyor segments 1.

Figure 1B:
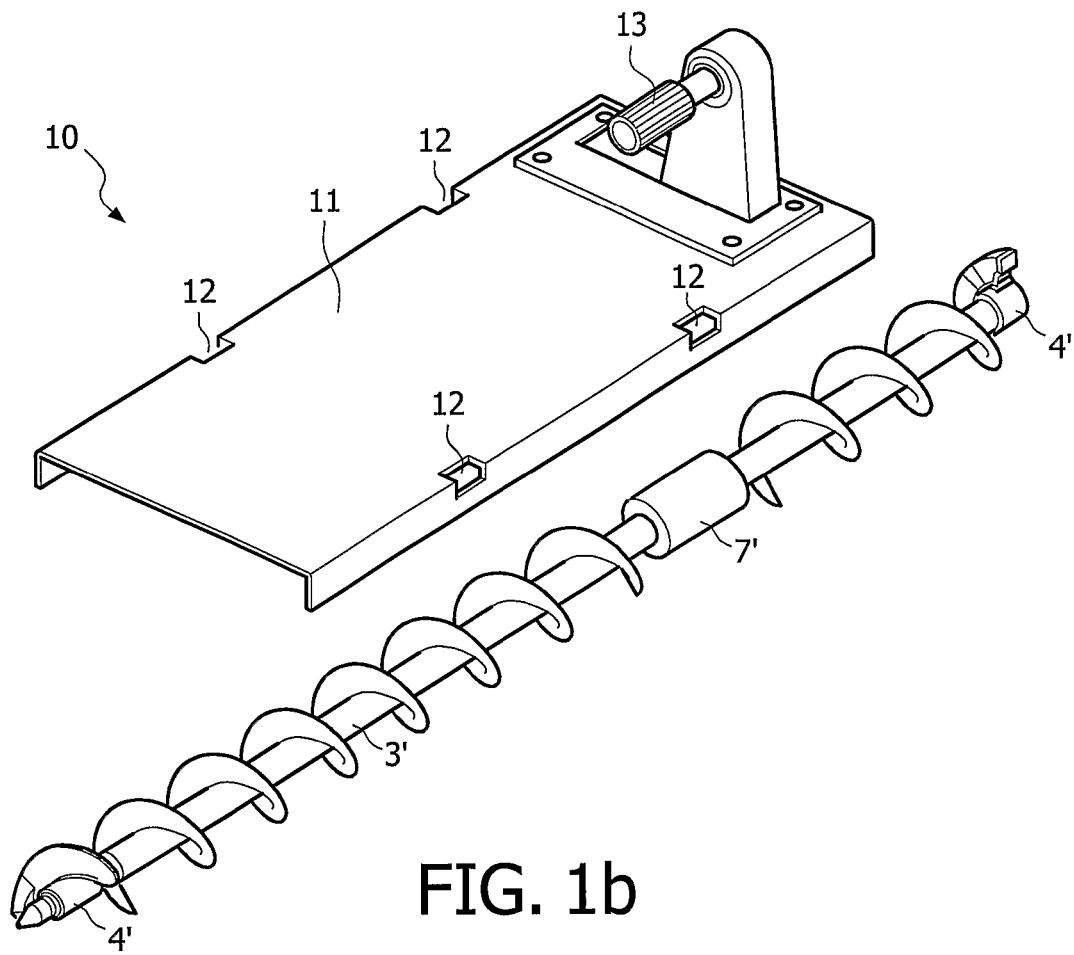
FIG. 1B shows a perspective view of driving means according the present invention.

FIG. 1B shows driving means 10 attachable on top of the housing 2 of the conveyor segment 1 shown in FIG. 1A. The driving means 10 comprise a cover 11 provided with four holes 12 designed for attachment of lifting hooks used for carrying the driving means 10 during placement on or detachment from a conveyor segment 1 according the invention. The driving means 10 further comprises a hydraulic or electric motor 13 and a mechanical coupling (not shown) for conveying mechanical power from the motor 13 to the coupling area 7' of the screw conveyors 3' (numbers correspond to the numbers in FIG. 1A). The screw conveyor 3' is shown to depict the relative position of driving means 10 placed on top of the conveyor segment 1 in FIG. 1A. The second screw conveyor 3' is omitted for clarity. The mechanical power of the motor 13 is also transmitted by the screw conveyor 3' to adjacent conveyor segments connected with the connectors 4' of the screw conveyor 3'. As the power of the driving means 13 is transmitted by the chain of screw conveyors 3' in a train of conveyor segments 1, torque strain is relieved not only from the conveyor segment 1 that has driving means 10 attached to it, but also to neighbouring conveyor segments 1.

Figure 1C:
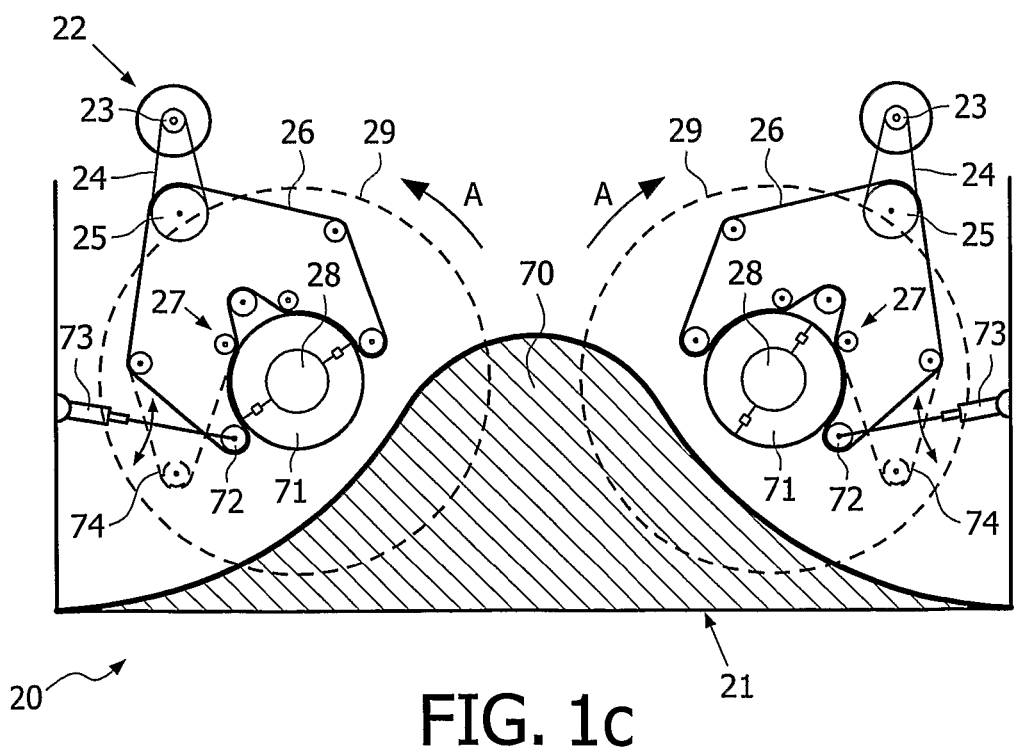
FIG. 1C shows a cross section of the coupling of a conveyor segment and driving means.

FIG. 1C shows a schematic cross section of a part of an assembly 20 of a conveyor segment 21 and driving means 22. Two driven shafts 23 (driven by a motor not shown), transfer the power through a input belt or chain 24, which in turn drive shafts 25 that connect to main driving belts 26. The main driving belt 26 couples to the coupling means 27 on screw conveyor shafts 28. The dotted lines 29 outline the screw conveyors that rotate according to arrows A in order to transport mined material 70 through the conveyor segment 21. The screw conveyor shafts 28 are each provided with coupling means 71 formed by two half bushing parts fitted around the shafts 28, thus making them made easily replaceable in case of wear. Further, the connection from the main driving belt 26 to the coupling means 27 is controlled by connection means 72, that are capable of connecting, tensioning and releasing the grip of the main driving belt 26 on the coupling means 27. In this case, the connection means 72 are formed by movable belt guiding means 73 that are capable of changing the main driving belt 26 from a gripping position (currently shown) towards a release position (74, shown in dotted lines). This enables flexibility in coupling and uncoupling. The construction shown here ensures that the part of the coupling means 27 in contact with the main driving belt 26 is located away from the transport area 70. Thus, contact of mined material and the driving belt 26 is minimized, diminishing the risk of malfunctioning of the belt 26 and obstruction of the mined material in the transport area 70. The driving belt 26 enables the transmission of substantial power that is required in an assembly 20 according the invention and is also suited for mining conditions.

Figure 2:
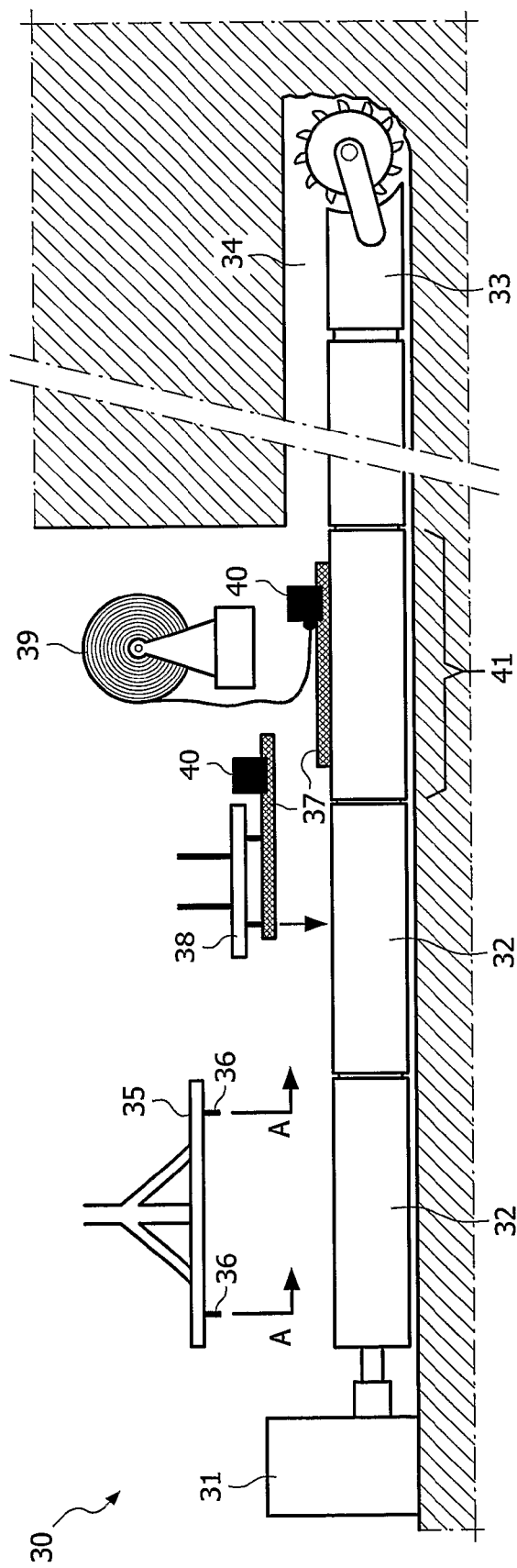
FIG. 2 shows the method according the invention using a launching platform according the present invention.

FIG. 2 describes the method according the invention using a launching platform 30 according the invention. The launching platform 30 comprises a main engine 31 for driving the conveyor belts or conveyor screws of the conveyor segments 32 (also known as push beams). The frame carrying the functional parts of the launching platform 30 is not shown. The mechanical power from the main engine 31 is transmitted through the conveyor segments 32. As the cutter head 33 advances while digging an increasingly deeper mine shaft 34, the conveyor segments 32 are pushed further into the mine shaft 34 by a pusher 35, and more conveyor segments 32 are added to the train. The pusher 35 is provided with gripping elements 36 that temporarily attach to a conveyor segment 32 and shift the train of conveyor segments 32 forward according arrows A. As the train of conveyor segments 32 becomes longer, more power from the main engine 31 is needed in order to facilitate the transport of mined material by the increasing number of conveyor segments 32. In longer trains, this puts great strain on the transmission means of the conveyor segments 32 that transmit the mechanical power from the main engine 31 through the train of conveyor segments 32. When conveyor segments 32 use a conveyor screws as conveyor means (see FIGS. 1A, 1b, 1C), the conveyor means are also used as transmission to distribute the mechanical power from the main engine 31. In longer trains of conveyor segments 32, it is advantageous to add one or more driving means 37 to at least one of the conveyor segments 32 according the invention. This may be done by a lifting device 38 that negotiates the driving means 37 to the right position for coupling to the conveyor element 32. In this case, also a power line 39 is connected to the motor 40 of the driving means 37. The power line 39 may also comprise communication lines. The formed assembly 41 of push beam 32 and driving means 37 is then pushed into the mine shaft 34. When the driving means 37 are used, it relieves strain induced by the main engine 31 to the transmission means of the assembly 41. Also, conveyor segments 32 without driving means 37 close to the assembly 41 benefit from strain relief, as they are interconnected by transmission means of the conveyor segments 32. Alternatively, also pre-formed assemblies 41 may be added as such to the train of conveyor segments 32, thus making it unnecessary to have the lifting device 38 on the launching platform 30. The launching platform 30 may also be used in a reversed mode, when the conveyor segments 32 are to be taken out of the mine shaft 34.

Figure 3:
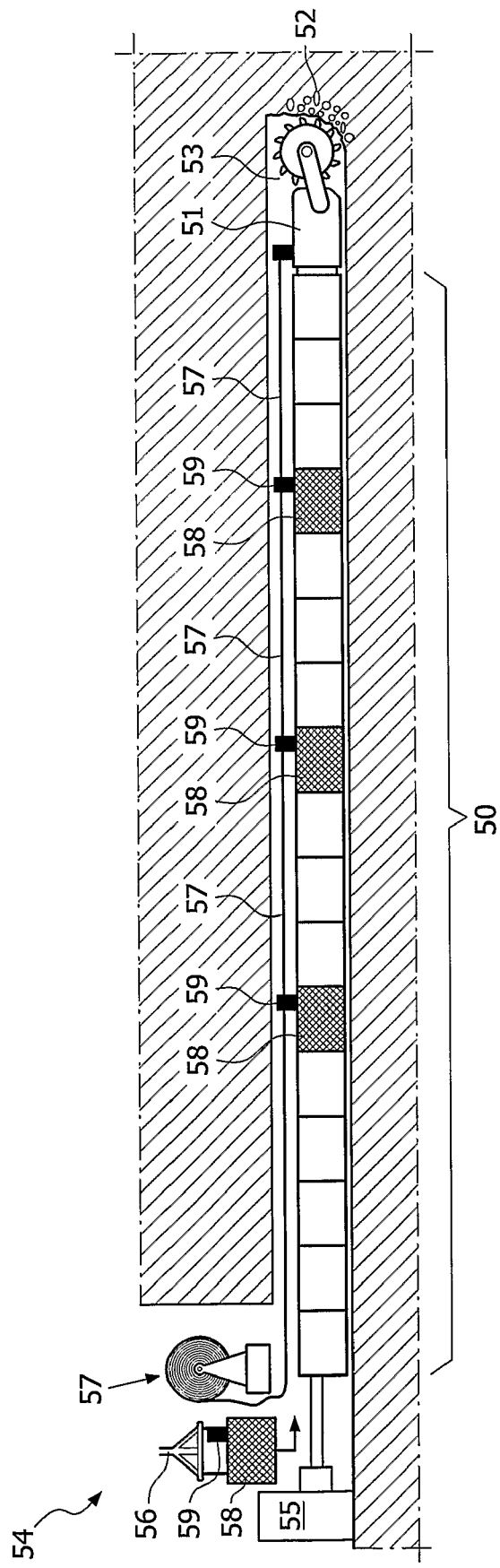
FIG. 3 shows a train of conveyor segments according the present invention.

FIG. 3 shows a train of conveyor segments 50 according the invention. The train 50 connects to a cutter head 51 that mines material 52 such as coal or ores, that is transported out of the mining shaft 53 by the train of conveyor segments 50. At the entrance of the mining shaft 53 a launching platform 54 is shown schematically. The launching platform 54, comparable to the launching platform 30 in FIG. 2, comprises a main engine 55 that drives the conveyor means of the train of conveyor segments 50, shifter/mover means 56 for adding new conveyor segments to the train 50, and for pushing the growing train 50 forward into the mine shaft, and a roll of power line 57, that supplies power to the cutter head 51. In this particular case, the motors 59 are already attached to the conveyor segments 58 before they are added to the train 50 at the launching platform 54. The train of conveyor segments 50 comprises a couple of conveyor segments 58 according the invention, equipped with motors 59. The motors 59 are coupled to the transmission of the conveyor segments 58, and thus the power of the motors is distributed over the train of conveyor segments 50. The motors are powered by the power line 57. This may be the same power line that powers the cutter head 57, but it is preferred if the power line 57 for the motors 59 runs separately from the power line 57 for the cutter head 53, as this makes it easier to control the cutter head 53 and the motors 59 independently. In this particular case, the power line 57 comprises multiple power lines for motors 59 and cutter head 51. The conveyor segments according the invention may be used in cooperation with conveyor segments known in the art, that are not suited for the coupling of additional driving means. The motors 59 are evenly distributed along the train of conveyor segments 50, allowing for an evenly distributed power that results in an improved torque strain control. In order to even further improve this, the motors 59 are equipped with communication and control means, ensuring that the motors 59 operate in an orchestrated and optimized manner.

Many more preferred embodiments are possible for a person skilled in the art, other than the non-limitative examples described here.

The invention claimed is:

1. Conveyor segment assembly for use in a train of conveyor segments for high wall mining, comprising a conveyor segment and an assisting driving assembly detachably coupled to the conveyor segment;

wherein the conveyor segment comprises:

a conveyor for transporting mined material from and to opposite adjacent conveyor segments in a train of conveyor segments, and a transmission for transmitting power from and to opposite adjacent conveyor segments in a train of conveyor segments and for transmitting power to the conveyor, wherein the transmission is provided with a coupling assembly for cooperation with the assisting driving assembly, and wherein the assisting driving assembly comprises a motor and a mechanical coupling for conveying mechanical power from the motor to the coupling assembly of the conveyor segment, the assisting driving assembly transmitting power to the opposite adjacent conveyor segments of the train and being transported with conveyor segment to which it is detachably coupled.

2. Conveyor segment assembly as claimed in claim 1, characterized in that the conveyor segment comprises a driving assembly power supply line for power supply to the driving assembly attached to the conveyor segment.

3. Conveyor segment assembly of claim 1, wherein the assisting driving assembly is provided with a grip for handling the driving assembly.

4. Conveyor segment assembly of claim 1, wherein the assisting driving assembly comprises a controlling device.

5. Conveyor segment assembly of claim 1, wherein the assisting driving assembly comprises communication means.

6. Conveyor segment assembly of claim 1, wherein the assisting driving assembly comprises an electrical motor.

7. Conveyor segment assembly of claim 1, wherein the assisting driving assembly comprises a hydraulic motor.

8. Train of conveyor segments, comprising at least one conveyor segment assembly as claimed in claim 1.

9. Train of conveyor segments comprising a plurality of conveyor segment assemblies according to claim 1.

10. Method for high wall mining comprising the process steps:

the in succession coupling of a number of conveyor segments to form a train of conveyor segments connecting to a cutter head, the coupling of transmissions of adjacent conveyor segments, the driving of the coupled transmissions by an external power source located outside the mine shaft, and the transportation of mined material from the cutter head by the train of conveyor segments towards the entrance of the mine shaft, characterized in that the driving of the transmissions is assisted by at least one assisting driving assembly detachably coupled to a conveyor segment as claimed in claim 1 incorporated in the train of conveyor segments.

11. Method as claimed in claim 10, characterized in that the driving of the transmissions is assisted by a plurality of driving assemblies connected to conveyor segments.

12. Method as claimed in claim 11, characterized in that the plural driving assemblies are individually connected to different conveyor segments mutually separated by at least one conveyor segment without a driving assembly.

* * * * *